(12) United States Patent
Tepmongkol et al.

(10) Patent No.: US 10,373,386 B2
(45) Date of Patent: Aug. 6, 2019

(54) SYSTEM AND METHOD FOR VIRTUALLY TRYING-ON CLOTHING

(71) Applicant: Ohzone, Inc., Santa Clara, CA (US)

(72) Inventors: Warangkana Tepmongkol, Santa Clara, CA (US); John R. Myers, Westminster, CA (US); Richard W. Bunce, Boise, ID (US); Kevin P Acken, Mountain View, CA (US)

(73) Assignee: Ohzone, Inc., Santa Clara, CA (US)

( * ) Notice: Subject to any disclaimer, the term of this patent is extended or adjusted under 35 U.S.C. 154(b) by 0 days.

(21) Appl. No.: 15/436,514

(22) Filed: Feb. 17, 2017

(65) Prior Publication Data

US 2017/0236333 A1    Aug. 17, 2017

Related U.S. Application Data

(60) Provisional application No. 62/296,005, filed on Feb. 16, 2016.

(51) Int. Cl.
  *G06T 19/00* (2011.01)
  *G06Q 30/06* (2012.01)
  *H04N 13/282* (2018.01)

(52) U.S. Cl.
  CPC ....... *G06T 19/006* (2013.01); *G06Q 30/0643* (2013.01); *G06T 19/00* (2013.01); *G06T 2210/16* (2013.01); *H04N 13/282* (2018.05)

(58) Field of Classification Search
  None
  See application file for complete search history.

(56) References Cited

U.S. PATENT DOCUMENTS 5,680,528 A    10/1997   Korszun
5,822,466 A    10/1998   Morfill et al.
(Continued)

FOREIGN PATENT DOCUMENTS

EP    2462564 B1    4/2014

OTHER PUBLICATIONS

Protopsaltou, D., Luible, C., Arevalo, M., & Magnenat-Thalmann, N. (2002). A body and Garment Creation Method for an Internet Based Virtual Fitting Room. In Advances in Modelling, Animation and Rendering (pp. 105-122). Springer London. https://doi.org/10.1007/978-1-4471-0103-1_7.
(Continued)

*Primary Examiner* — Michael J Cobb
(74) *Attorney, Agent, or Firm* — Witkowski Law

(57) ABSTRACT

A system for creating a model of a model of a wearable on a portion of a human body, the system includes a processor configured to receive a three-dimensional model of a portion of a human body wearing the wearable, the processor configured to: access a three-dimensional model of a portion of a human body comprising a plurality of slices each having a plurality of vertices around a centroid; access a model of the wearable comprising a plurality of values, each of the values being associated with one of the plurality of vertices around the centroid of one of the plurality of slices; add each of the plurality of values to the distance of each corresponding one of the plurality of vertices around the centroids of the plurality of slices, the associated value representing a distance between the surface of the wearable and the underlying surface of the human body; and a storage means for storing the table representing the clothing article.

17 Claims, 11 Drawing Sheets

(56) References Cited

U.S. PATENT DOCUMENTS

| | | | |
|---|---|---|---|
| 5,850,222 A | 12/1998 | Cone | |
| 5,923,780 A | 7/1999 | Morfill et al. | |
| 5,930,769 A | 7/1999 | Rose | |
| 6,009,212 A | 12/1999 | Miller et al. | |
| 6,182,871 B1 | 2/2001 | Lam | |
| 6,307,568 B1 | 10/2001 | Rom | |
| 6,310,627 B1 | 10/2001 | Sakaguchi | |
| 6,404,426 B1 | 6/2002 | Weaver | |
| 6,415,199 B1 | 7/2002 | Liebermann | |
| 6,546,309 B1 | 4/2003 | Gazzuolo | |
| 6,556,196 B1 | 4/2003 | Blanz et al. | |
| 6,611,630 B1 | 8/2003 | Miller et al. | |
| 6,888,965 B1 | 5/2005 | Rath et al. | |
| 6,901,379 B1 | 5/2005 | Balter et al. | |
| 7,133,839 B2 | 11/2006 | Inoue et al. | |
| 7,149,665 B2 | 12/2006 | Feld et al. | |
| 7,328,177 B2 | 2/2008 | Lin-Hendel | |
| 7,355,597 B2 | 4/2008 | Laidlaw et al. | |
| 7,398,133 B2 | 7/2008 | Wannier et al. | |
| 7,433,753 B2 | 10/2008 | Okada et al. | |
| 7,492,934 B2 | 2/2009 | Mundy et al. | |
| 7,978,887 B2 | 7/2011 | Mundy et al. | |
| 8,170,919 B2 | 5/2012 | Barbour et al. | |
| 8,275,590 B2 | 9/2012 | Szymczyk et al. | |
| 8,290,568 B2 | 10/2012 | Pichler et al. | |
| 8,359,247 B2 | 1/2013 | Vock | |
| 8,364,561 B2 | 1/2013 | Wolper et al. | |
| 8,427,656 B2 | 4/2013 | Hullin et al. | |
| 8,438,081 B2 | 5/2013 | Gray et al. | |
| 8,515,145 B2 | 8/2013 | Mundy et al. | |
| 8,605,148 B2 | 12/2013 | Robertson | |
| 8,700,477 B2 | 4/2014 | Wolper et al. | |
| 8,711,175 B2 | 4/2014 | Aarabi | |
| 8,818,883 B2 | 8/2014 | Lawrence et al. | |
| 8,942,456 B2 | 1/2015 | Hesthaven et al. | |
| 9,147,207 B2 | 9/2015 | Haaramo et al. | |
| 9,189,886 B2 | 11/2015 | Black et al. | |
| 9,191,579 B2 | 11/2015 | Seidel et al. | |
| 9,241,184 B2 | 1/2016 | Weerasinghe | |
| 9,292,967 B2 | 3/2016 | Black et al. | |
| 9,489,744 B2 | 11/2016 | Black et al. | |
| 9,576,198 B2 | 2/2017 | Mundy et al. | |
| 9,679,409 B2 | 6/2017 | Black et al. | |
| 9,710,964 B2 | 7/2017 | Loper et al. | |
| 9,761,060 B2 | 9/2017 | Black et al. | |
| 9,799,098 B2 | 10/2017 | Seung et al. | |
| 9,898,848 B2 | 2/2018 | Black et al. | |
| 9,961,328 B2 | 5/2018 | Wu et al. | |
| 10,002,460 B2 | 6/2018 | Black et al. | |
| 10,008,007 B2 | 6/2018 | Taubin et al. | |
| 10,032,254 B2 | 7/2018 | Harmeling et al. | |
| 2001/0026272 A1 | 10/2001 | Feld et al. | |
| 2001/0042029 A1 | 11/2001 | Galvez | |
| 2003/0065578 A1 | 4/2003 | Peyrelevade et al. | |
| 2003/0076318 A1 | 4/2003 | Shaw-Weeks | |
| 2003/0101105 A1 | 5/2003 | Vock | |
| 2004/0049309 A1 | 3/2004 | Gardner et al. | |
| 2004/0083142 A1 | 4/2004 | Kozzinn | |
| 2004/0227752 A1 | 11/2004 | McCartha et al. | |
| 2005/0131776 A1 | 6/2005 | Perotti et al. | |
| 2005/0267614 A1 | 12/2005 | Looney et al. | |
| 2006/0202986 A1 | 9/2006 | Okada et al. | |
| 2006/0287877 A1 | 12/2006 | Wannier et al. | |
| 2007/0005174 A1 | 1/2007 | Thomas | |
| 2007/0057942 A1 | 3/2007 | Unal | |
| 2007/0130020 A1 | 6/2007 | Paolini | |
| 2007/0179867 A1 | 8/2007 | Glazer et al. | |
| 2007/0198120 A1 | 8/2007 | Wannier et al. | |
| 2008/0249897 A1 | 10/2008 | Oh et al. | |
| 2009/0018926 A1 | 1/2009 | Buehlman | |
| 2009/0089186 A1 | 4/2009 | Paolini | |
| 2009/0115777 A1 | 5/2009 | Reyers Moreno | |
| 2010/0094729 A1 | 4/2010 | Gray et al. | |
| 2010/0191770 A1 | 7/2010 | Cho et al. | |
| 2010/0306082 A1 | 12/2010 | Wolper et al. | |
| 2011/0022965 A1 | 1/2011 | Lawrence et al. | |
| 2011/0078055 A1 | 3/2011 | Faribault et al. | |
| 2011/0298897 A1 | 12/2011 | Sareen et al. | |
| 2012/0022978 A1 | 1/2012 | Manea et al. | |
| 2012/0136755 A1 | 5/2012 | Yang | |
| 2012/0299912 A1* | 11/2012 | Kapur | G06F 3/017 345/419 |
| 2013/0018763 A1 | 1/2013 | Ajala | |
| 2013/0083065 A1 | 4/2013 | Schulze | |
| 2013/0173226 A1 | 7/2013 | Reed et al. | |
| 2013/0215116 A1* | 8/2013 | Siddique | G06Q 30/0643 345/420 |
| 2013/0249908 A1 | 9/2013 | Black et al. | |
| 2013/0293686 A1 | 11/2013 | Blow et al. | |
| 2014/0006386 A1 | 1/2014 | Oh | |
| 2014/0022238 A1 | 1/2014 | Oh | |
| 2014/0089135 A1 | 3/2014 | Linh et al. | |
| 2014/0108208 A1 | 4/2014 | Piana | |
| 2014/0149264 A1 | 5/2014 | Satyanarayana et al. | |
| 2014/0176565 A1* | 6/2014 | Adeyoola | G06T 19/006 345/473 |
| 2014/0225888 A1 | 8/2014 | Bell et al. | |
| 2014/0368499 A1 | 12/2014 | Kaur | |
| 2015/0131869 A1* | 5/2015 | Brouet | G06T 17/00 382/111 |
| 2015/0243076 A1* | 8/2015 | Jeong | G06T 17/20 345/423 |
| 2016/0035142 A1* | 2/2016 | Nair | G06T 19/20 345/420 |
| 2016/0138914 A1* | 5/2016 | Chang | G06K 9/00 702/167 |
| 2016/0148436 A1 | 5/2016 | Chang | |
| 2016/0150217 A1 | 5/2016 | Popov | |
| 2016/0180449 A1* | 6/2016 | Naware | G06Q 30/0643 705/27.2 |
| 2016/0180562 A1* | 6/2016 | Naware | G06F 3/04842 345/419 |
| 2017/0214943 A1 | 7/2017 | Cohen | |
| 2017/0249783 A1 | 8/2017 | Mach Shepherd | |
| 2017/0256093 A1* | 9/2017 | Choi | G06T 17/20 |

OTHER PUBLICATIONS

Apparel Highest-Selling Category in E-Commerce in 2015. (Apr. 4, 2016). Retrieved Feb. 11, 2017, from https://sourcingjournalonline.com/apparel-was-highest-selling-category-in-online-retail-in-2015/.

Cordier, Frédéric, Wonsook Lee, Hyewon Seo, and Nadia Magnenat-Thalmann. "Virtual-try-on on the web." Laval Virtual (2001).

Weiss, A., Hirshberg, D., & Black, M. J. (2011). Home 3D body scans from noisy image and range data. In 2011 International Conference on Computer Vision. IEEE https://doi.org/10.1109/iccv.2011.6126465.

* cited by examiner

SYSTEM AND METHOD FOR VIRTUALLY TRYING-ON CLOTHING

CROSS-REFERENCE TO RELATED APPLICATIONS

This U.S. non-provisional application claims the benefit of U.S. provisional application No. 62/296,005, filed on Feb. 16, 2016, the contents of which are expressly incorporated by reference herein. This U.S. non-provisional application is related to the following commonly-owned U.S. patent publications, which are hereby expressly incorporated by reference in their respective entireties:

(1) U.S. Pat. No. 10,127,717, entitled "System for 3D Clothing Model Creation", issued on Nov. 13, 2018, which claims the benefit of U.S. provisional application No. 62/296,001, filed on Feb. 16, 2016;

(2) U.S. patent publication US20170236197A1 entitled "Virtually Sharing Customized Clothing", published on Aug. 17, 2017, which claims the benefit of U.S. provisional application No. 62/296,008, filed on Feb. 16, 2016; and (3) U.S. patent publication US20170293941A1, entitled "System and Method for Targeted Personalized Ads", published on Oct. 12, 2017, which claims the benefit of U.S. provisional application No. 62/296,013, filed on Feb. 16, 2016.

BACKGROUND

Technical Field

This disclosure relates generally to the field of representing a graphical object display modeling using mathematical algorithms. More particularly, the disclosure relates to creating three-dimensional models of personalized bodies wearing selected clothing and other wearables.

Background Art

Description

One of the basic needs of human beings is clothing. In 2016, annual apparel sales were expected to exceed $1.4 trillion globally, and more than $300 billion in the United States. In 2015, apparel became the highest selling category in online retail within the United States, reaching about $75 billion in annual sales.

There are advantages in selling and purchasing clothing online. From the customers point of view, the time and effort to travel to the store may be avoided. They may purchase the clothing directly on their computer wherever they happen to be. From the retailer's point of view, the need for brick and mortar stores may be avoided altogether or reduced in number, thereby potentially saving retail store rents. The self-service nature of online sales may reduce the need for retail sales staff, and the associated costs.

There may also be disadvantages in selling and purchasing clothing online. In contrast to a customer who visits a brick-and-mortar retail store, an online customer cannot physically try on clothing before purchase. The lack of pre-sales fitting may increase the return rate because customers find that they are not satisfied with the fit or look of the clothing when they receive the order. The extra shipping and handling cost and effort of returned items can discourage purchases in the online sales channel, increase wear on unsold merchandise, and reduce profits.

E-commerce websites often display images of clothing dressed on mannequins or human models so that potential customers can visualize the clothes as they would be worn. These images are often generated by the manufacturer or the retailer to promote the product. These photographed professional models that may not represent the body type of the typical customer. However, many retailers also take photos of so-called plus-sized models and others that may represent more typical customers. These efforts may help potential customers better visualize the clothing on themselves.

When a potential customer visits a retail store, they typically have the option to try on in-stock clothing. They can verify which size of any such garments fit them and can see how the selected garment looks on them. They can try on clothing and get immediate feedback from the friends or family who visit the store with them. However, online purchases are fulfilled through centralized warehouses that may provide an advantage in terms of consolidated inventory. Consolidated inventory may allow a wider range of stocking units (SKUs) and sizes than can cost-effectively be maintained in inventory in each of numerous smaller retail stores.

Clothing retailers often provide generous return policies for clothing that is purchased online. This may encourage consumers to make online purchases of clothing despite the lack of a pre-sales fitting process.

SUMMARY

People are accustomed to trying on clothes in a retail stores before purchase. A disadvantage of online purchases has been a potential customer's inability to try-on articles of clothing and other wearables to see if the fit and evaluate their look.

Complex three-dimensional display modeling and physical simulation has been used to render images of people wearing clothing. The substantial time and/or compute resources required to generate such models requires that they be generated in anticipation of a request to display. Given the number of stock keeping units (SKUs) in a clothing line, including variations in sizes and materials, the significant skilled labor, time, and compute resources required to generate 3D models of a person wearing each item is substantial.

A system and method for rendering a virtual representation of a person trying on an article of clothing is disclosed. Innovative subject matter takes advantage of difference tables as described herein to model wearables. Difference tables simplify the mathematical transformations required to render an image of a human body wearing the article of clothing or other wearable represented by the difference table. The reduced computational demands make it feasible to render personalized 3D models of a user wearing a specified wearable in response to a request by a user to virtually try-on the wearable in an online e-commerce platform, for example. In some embodiments, the simplified computational process makes it practical for computational processes to be carried out on the customer's client device, such as a notebook computer or a smartphone.

A personalized avatar is created. In some embodiments, the avatar is created by scanning a human being with a three-dimensional (3D) scanner using one or more depth sensors. In other embodiments, a user may take multiple two-dimensional (2D) photos which are processed to generate a 3D model. In other embodiments, an individual's body measurements, such as bust, waist, and inseam, are used to resize a computer-generated 3D mesh. The personalized model of the human being may be represented as a point cloud. This point cloud may include color and texture information for each point in the point cloud to render exposed portions of the personalized model of the human being.

In some embodiments, a difference table is used to represent each article of clothing or other wearable. A difference table includes scalar values associated with points of a reference model of the human body. These scalar values represent the distance between the surface of a naked body and the surface of the wearable when worn on the body. When an individual wants to virtually try-on the wearable, the scalars of the difference table for that wearable are added to the corresponding points of the point cloud of the personalized model of the human body. Color and texture information may also be associated which each point. This color and texture represents the color and texture of the wearable at that point.

DETAILED DESCRIPTION

Various examples of embodiments will be described below with reference to the drawings. The following exemplary embodiments are illustrative and are not to be construed as limiting.

A system and method for rendering a virtual representation of a person trying on an article of clothing or other wearable is disclosed. Innovative subject matter takes advantage of difference tables as described herein to model wearables. Difference tables simplify the mathematical transformations required to render an image of a human body wearing the article of clothing or other wearable. The reduced computational demands make it feasible to render personalized 3D models in response to a request by a user to virtually try-on the wearable in an online e-commerce platform, for example. In some embodiments, the simplified computational process makes it practical for such computational processes to be carried out on the customer's client device, such as a notebook computer or a smartphone.

Figure 1:
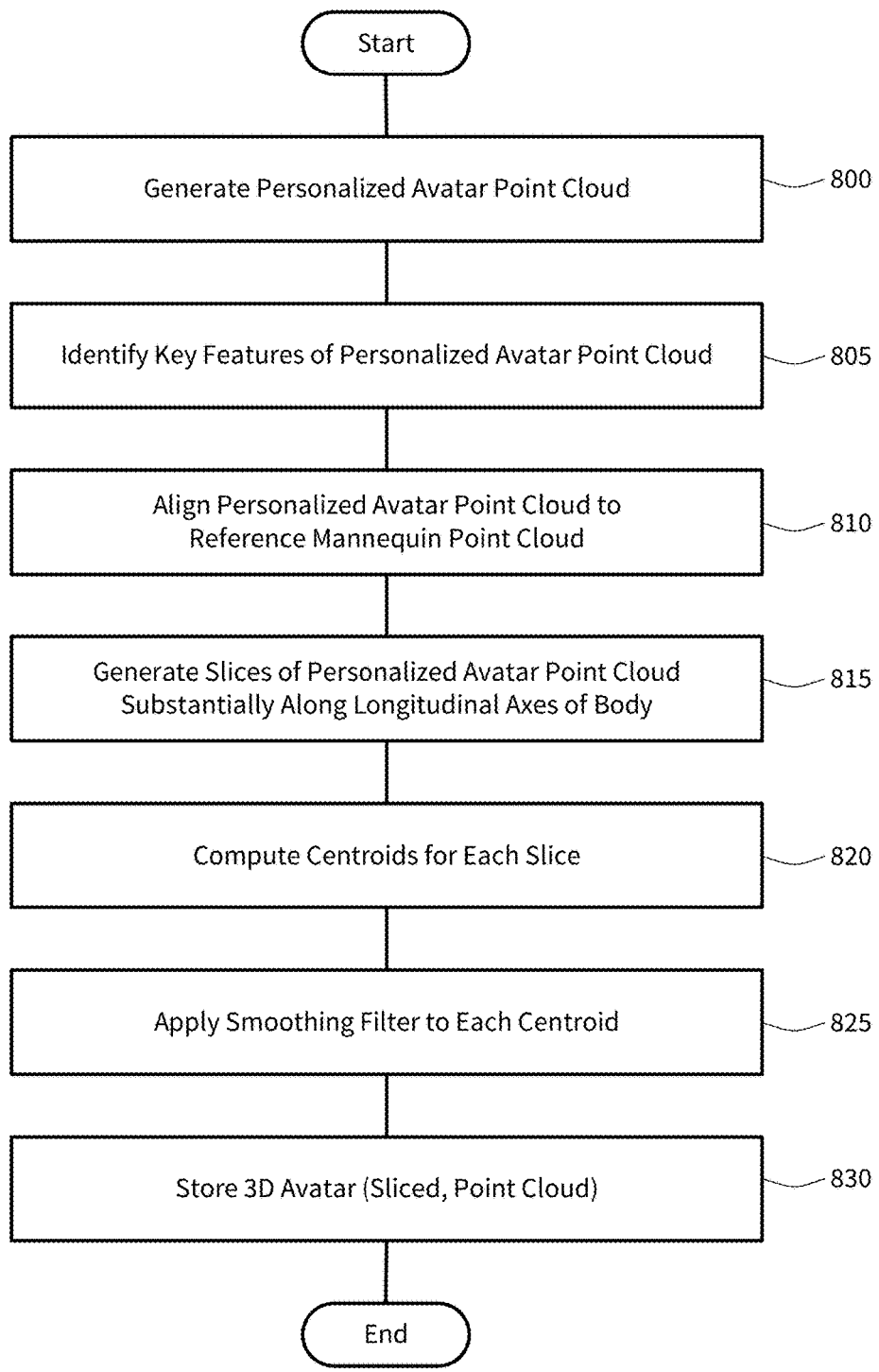
FIG. 1 illustrates one embodiment of a process for generating and storing a personalized avatar for use with a difference table for selected wearables.

FIG. 1 is one embodiment of a flow chart of the process for generating an avatar for a user. The avatar is a model of the body of the user. In a preferred embodiment, the avatar is a life-like representation of a human body that has proportions that approximate that of the associated user.

In a preferred embodiment, the avatar is captured as a point cloud, separated into slices for parallel processing, and aligned with a reference mannequin point cloud for use with difference tables in the wearable try-on process. In a preferred embodiment, this avatar creation process is performed once when first generating the avatar for a user. This avatar creation process may be repeated for a user when the user re-captures their body dimensions because they have gained or lost weight, for example.

In some embodiments, the point clouds are not separated into slices. The difference table is applied to the points on the point cloud of the avatar as a whole.

In step 800, an avatar is generated for a user by capturing their body dimensions.

In a preferred embodiment, the avatar is created by scanning the user's body with a three-dimensional (3D) scanner using one or more depth sensors. In other embodiments, multiple two-dimensional (2D) photos of the user's body are taken from different perspectives and processed to generate three-dimensional avatar. In other embodiments, an individual's body measurements, such as bust, waist, and inseam, are used to resize a standard pre-generated 3D model of a human body to be used as the avatar for the user. In some embodiments, personalization is limited to categories of body sizes and shapes, such as small, medium and large. Body features that may be less relevant to fit, like genitalia, may be omitted or obscured, by image processing or covered with underwear during the body capture process.

In a preferred embodiment, the avatar is represented using a point cloud. The point cloud is a constellation of points indicating the relative position of the surface of the user's body (and wearables like underwear that may cover portions of the user's body). This point cloud may include color and texture information for each point to render portions of the avatar that are not covered by wearables.

In step 805, key features in the avatar point cloud are identified. Key features may include the shoulder, neck, armpit or crotch, for example. Pattern recognition may be used to locate these key features in the point cloud.

In step 810, the avatar point cloud is aligned with a pre-configured reference mannequin point cloud by using common key features to both models. In a preferred embodiment, the reference mannequin is the mannequin used during the difference table generation process for the wearables. The difference tables are created relative to the points of the reference mannequin point cloud. By aligning the avatar point cloud with the reference mannequin point cloud, the points in the avatar point cloud are positioned to be transformed using difference tables for selected wearables.

In some embodiments, the reference mannequin is standardized in terms of size and shape so that the wearable does not have to be associated with a specific reference mannequin. In other embodiments, there may be several standard reference mannequin forms that are used, such as a male adult reference mannequin, a female adult reference mannequin and reference mannequins for children.

In step 815, the avatar point clouds are separated into slices by the various feature of the reference mannequin. Separating the point cloud into slices allows for more effective processing, including parallel processing by graphics processing units.

The avatar point cloud is generally sliced perpendicular to the lengthwise axis for each body feature. For example, the slices in the arms are sliced perpendicular to the lengthwise axis of each arm. The slices in the legs are cut perpendicular to the axis along the lengthwise axis of each leg. The slices in the torso are cut perpendicular to the lengthwise axis of each trunk. The slices in the torso are cut perpendicular to the lengthwise axis of each trunk. Similarly, the head, hands and feet are cut along the associated lengthwise axis.

The sizes of the slices may vary depending on the relative size of the feature on the body. For example, the arms are split into smaller slices that the legs.

In step 820, centroids are computed for each slice. In a preferred embodiment, the point clouds are represented in polar coordinates. However, other representation systems may be used.

In step 825, a smoothing filter is applied to the centroids. The filter removes discontinuities and other irregularities in the positioning of adjacent slices along the lengthwise axis of each portion of the point cloud.

In step 830, the avatar point cloud is stored. In a preferred embodiment, the avatar is stored in as a sliced point cloud aligned with the reference mannequin so that no further processing is necessary for it to be morphed using difference tables for selected wearables during a wearable try-on process.

Figure 2:
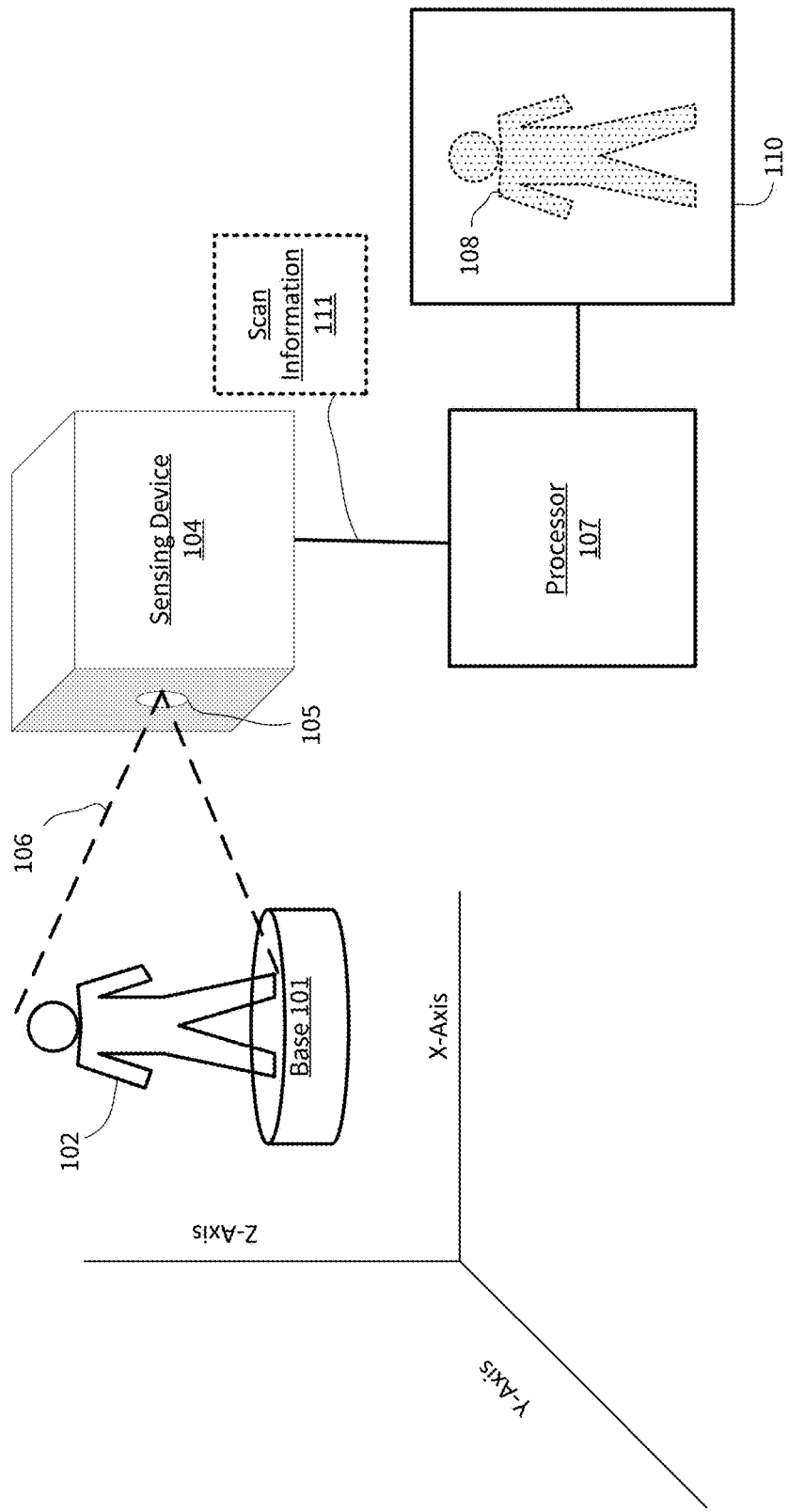
FIG. 2 illustrates one embodiment of a system of scanning a body to create an avatar.

FIG. 2 illustrates one embodiment of a system 100 for creation of an avatar for a human being 102 standing on a base 101.

A sensing device 104 is configured to receive information through a sensing input 105 under the control of a processor 107.

In some embodiments, the sensing device 105 is a depth sensor configured to measure the distance from the sensing input 105 to the surface of the human being 102 at one or more surface points within the field of view 106 of the sensing input 105.

In some embodiments, the sensing device 104 includes a sensing input 105 that has a single depth sensor that is moved in a controlled manner around the periphery of the human being 102 to capture the depth information from multiple perspectives around the human being 102. By tracking the relative motion between the sensing input 105 and the human being 102 for each of the depth measurements, the sensing device 104 can determine surface position information at various points on the reference mannequin 102. This information can be processed to produce a point cloud representing the scanned portion of the human being 102. Collectively, point cloud information represents the surface shape of the human being 102.

In other embodiments, the sensing device 104 remains in a fixed position and the base 101 is rotated through a 360° rotation in synchronization with the sensing input 105 of the sensing device 104 to gather the depth information from multiple perspectives around the human being 102.

In yet other embodiments, both the base 101 and the sensing device 104 are configured to move to gather the depth information from multiple perspectives around the human being 102.

In some embodiments, the sensing device 104 surrounds the human being 102 and the sensing input 105 includes an array of depth sensors dispersed around the human being 102 to capture all the depth information from multiple perspectives around the human being 102 in parallel.

Between the extremes of capturing all depth sensor information in parallel, and capturing each depth sense measurement in sequence, there may be smaller arrays of depth sensors that are moved around the reference mannequin 102 to capture the depth sensor information. More depth sensors allow more scanning to be performed in parallel which may lead to faster scan results. However, more depth sensors may require larger and more expensive scanning devices.

A scan information 111 is received by a processor 107. The scan information 111 includes each of the multiple depth measurements and the position of the associated sensor for each of the measurements. The scan information 111 may also include color and texture information at each of the points. The processor 107 processes the first scan information 111 according to well-known methods for processing depth information to generate a first point cloud 108 and stores the first point cloud 108 in a database 110. The first point cloud 108 is a constellation of points indicating the relative position of the surface of the human being 102 and color and/or texture information at those points as derived from the scan information 111.

In an alternative embodiment, the sensing device 104 is a two-dimensional (2D) image sensor that captures an image of the human being 102 from various perspectives around the human being 102 as described with reference to the depth sensor(s).

The first scan information 111 is received by the processor 107. The first scan information 120 includes each of the multiple 2D images and the associated perspectives of the one or more image sensors. The processor 107 processes the scan information 111 according to well-known methods for processing 2D image information to generate a point cloud 108 and transmits the point cloud 108 into a database 110. The point cloud 108 is a constellation of points indicating the relative position of the surface of the mannequin 102 and color and/or texture information at those points as derived from the scan information 120. The point cloud 108 is used as the avatar.

It will be apparent that other schemes for moving one or more sensors around the periphery of the mannequin 102 may be used to generate the scan information 111.

Figure 3:
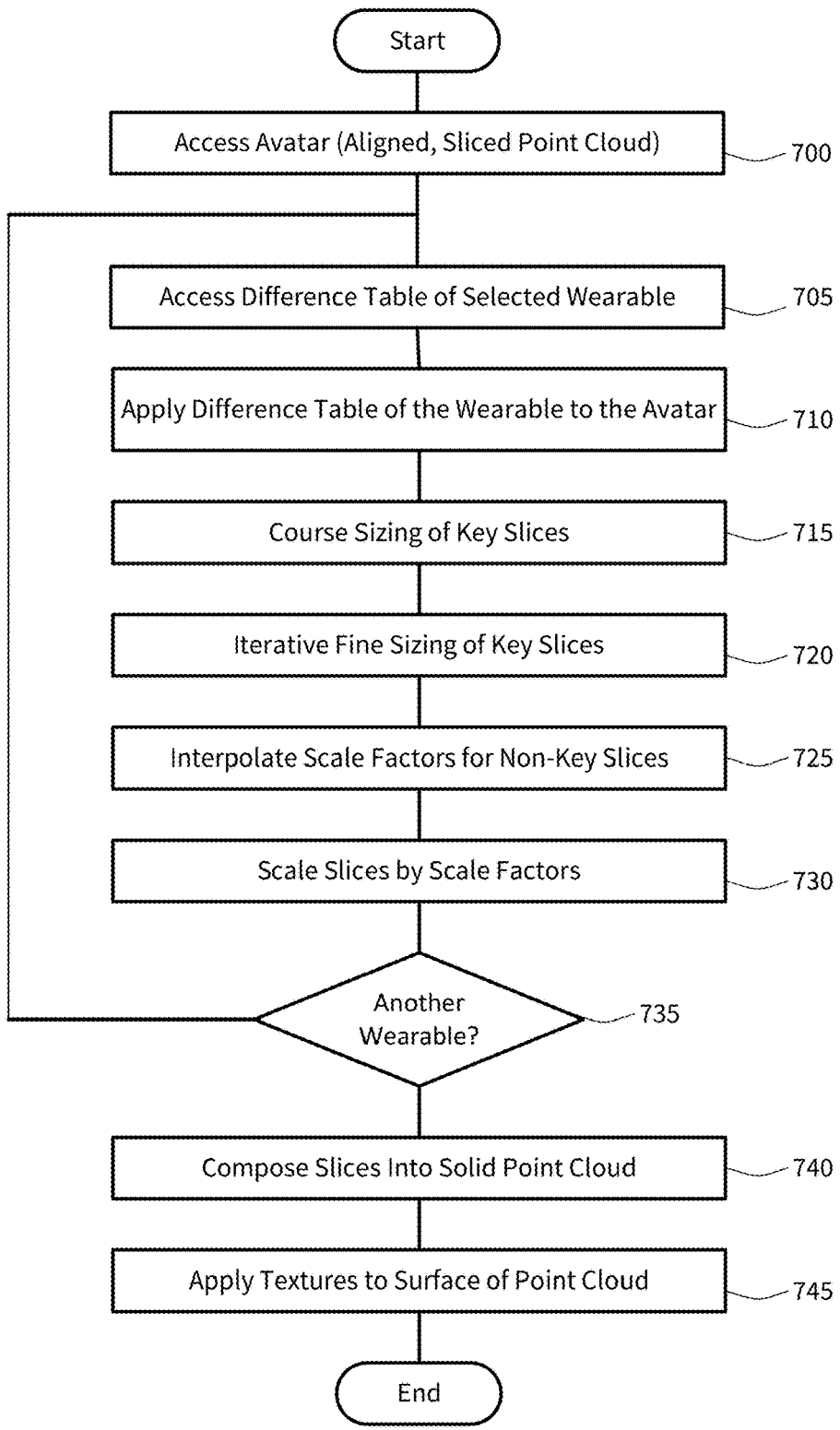
FIG. 3 shows one embodiment of a process for creating 3D rendering of an avatar trying on a wearable.

FIG. 3 is one embodiment of a flow chart of the process for rendering a three-dimensional image of a personalized body model wearing one or more articles of clothing or other wearable.

In step 700, an avatar is accessed. In a preferred embodiment, the avatar is a 3D point cloud that has been sliced and aligned with a reference mannequin so it is ready to be used with difference tables.

In step 705, a difference table for a wearable is accessed. In some embodiments, a user selects a particular article of clothing or other wearable to be tried on their personalized avatar. This selection might be made on a wearable product page on an e-commerce platform, for example. The user might click a button to virtually try this garment on. In response to the selection, the associated difference table for the wearable is loaded.

A difference table includes scalar values associated with points of a reference model of the human body. These scalar values represent the distance between the surface of a naked body and the surface of the wearable when worn on the body. When an individual wants to virtually try-on the wearable, the scalars of the difference table for that wearable are added to the corresponding points of the point cloud of the avatar. Color and texture information may also be associated which each point. This color and texture represents the color and texture of the wearable at that point.

In a preferred embodiment, the difference tables for wearables are generated as disclosed in U.S. Pat. No. 10,127,717, entitled "System for 3D Clothing Model Creation", issued on Nov. 13, 2018.

In some embodiments, an offset adjustment is applied to the difference tables before application to the avatar point cloud.

In step 710, the difference table for the selected wearable is applied to the avatar.

In a preferred embodiment, each difference in the difference table is associated with a particular point on the avatar using lookup table indexing based on the standard points of the reference mannequin. The difference is applied to the point on the avatar using the simple arithmetic operation. These operations can be performed in parallel for each slice using one or more graphics processing units.

Prior art systems use two three-dimensional meshes. With two meshes, computationally expensive collision detection must be performed to determine if and where the wearable mesh and the avatar mesh collide. Typically, vertices are added or deleted to accommodate the collision. These changes in the vertices generally require additional processing steps for the texture map.

In step 715, coarse sizing is applied to key slices of the wearable.

A perimeter is calculated for each key slice of the avatar. Key slices are associated with key measurements for a wearable. Key measurements might include bust size, hip size and shoulder width. The key slices for bust size would be the slices in the bust area of the trunk of the avatar. In a preferred embodiment the perimeter is calculated by integrating along the vertices of the perimeter of the slice. In one embodiment each slice has about 5000 vertices.

A generic ellipse with low polygon counts (e.g., 256 vertices) is fitted to each slice for faster perimeter calculation. In one embodiment, the generic ellipse shape and its foci are picked from statistical information on human body shapes.

A coarse scaling factor is calculated by scaling the generic ellipse for each slice to the wearable selected to be virtually tried on. For example, the perimeter for a particular slice might be between the small and medium sizes of the wearable. The coarse scaling factor to scale the perimeter for a particular key slice to small size may be 1.5 and the coarse scaling factor to scale the perimeter to medium-size for particular slice may be 2.2.

The coarse scaling factor is applied to key slices of the avatar and the calculated perimeter.

In step 720, and iterative fine sizing of key slices is performed.

The key slices that have been coarsely scaled are now finally sized using an iterative process.

The coarsely scaled key slice is incremented up or down depending on its relationship with the perimeter of the mesh garment. The perimeter is re-calculated. If the perimeter of the avatar is within a certain margin (also referred to as comfort factor) of the perimeter of the wearable than the fine scaling of the key slice is completed. Otherwise the key slices incremented up or down again and the margin to the comfort factor is reevaluated.

Over time the comfort factor for particular users may be adjusted depending on feedback as to actual fit from purchased wearables.

It step 725, scale factors for the slices other than the key slices are determined by interpolation based on the final scale factors for the key slices.

In step 730, the scale factors for the slices other than the key slices are applied to the non-key slices.

In step 735, is determined whether another wearable will be dressed on the avatar.

If another wearable is to be applied, the process continues at step 705 for another selected wearable. The application of the difference table in the sizing steps will be applied to the avatar as modified by previous steps. Generally the wearables should be processed in order from the wearable closest to the body to the wearable at the top layer.

In step 740, the slices are composed into a solid point cloud as described with reference to FIG. 4.

In step 745, textures are applied to the surface of the point cloud. Points of the avatar that are not covered by a wearable will have the texture of the avatar. Points of the avatar that are covered by at least one wearable will have the texture of the wearable at the top layer for that point.

Figure 4:
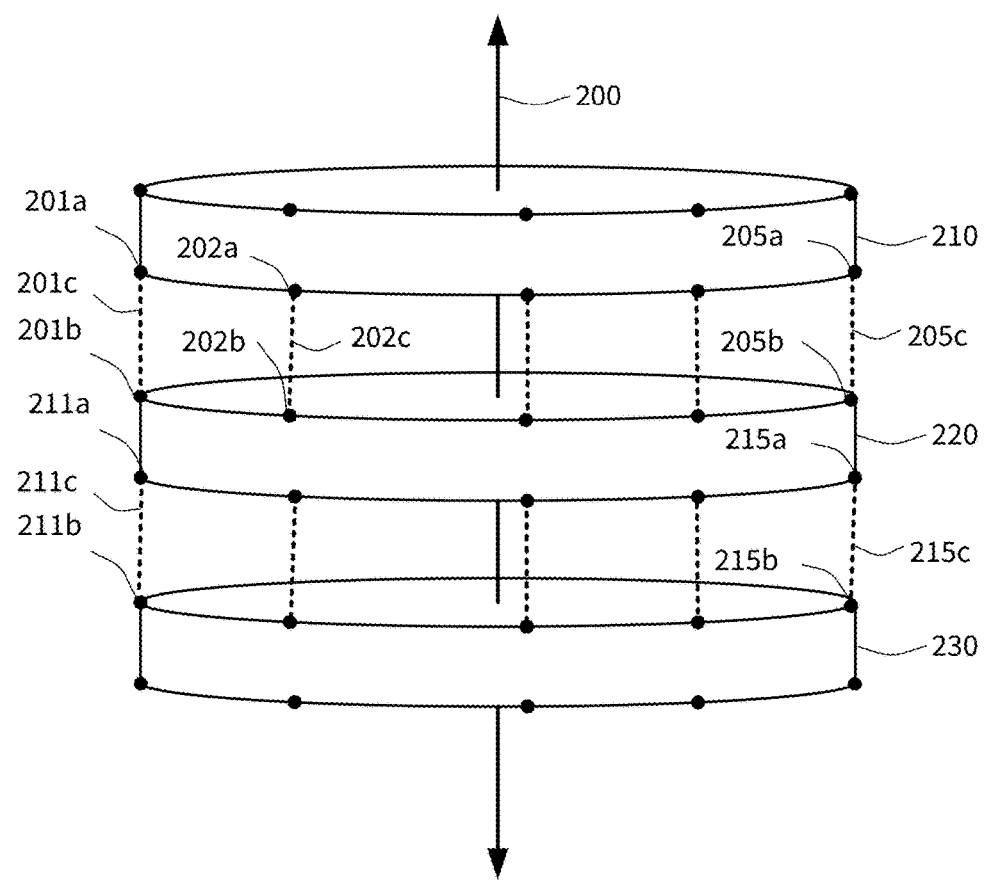
FIG. 4 illustrates one embodiment of a segment of a sliced point cloud.

FIG. 4 illustrates one embodiment of a segment of a sliced point cloud. The segment includes a slice 210, a slice 220 and a slice 230.

A lengthwise axis 200 passes through the centroids at the center of each slice.

A point 201*a* is a point at the boundary between slices. Only a few sample points are shown in the figure. In some embodiments, a slice may have approximately five thousand points dispersed around the sidewall of the slice to represent the surface of a point cloud of a body.

A point 201*b* represents the same point on the scanned object as the point 201*a* but it is assigned to the slice 220. The point 201*a* and the point 201*b* are associated with each other by a connection link 201*c*.

Similarly, a point 202*a* and a point 202*b* represent the same point on the scanned object but the point 202*a* is assigned to the slice 210 and the point 202*b* assigned to the slice 220. The point 202*a* and the point 202*b* are associated with each other by a connection link 202*c*.

Similarly, a point 205*a* and a point 205*b* represent the same point on the scanned object but the point 205*a* is assigned to the slice 210 and the point 202*b* assigned to the slice 220. The points 205*a* and 205*b* are associated with each other by a connection link 205*c*.

Similar relationships are created at the boundary between the slice 220 and the slice 230. A point 211*b* represents the same point on the scanned object as a point 211*a*. Point 211*a* is assigned to the slice 220 and the point 211*b* is assigned to the slice 230. The point 211*a* and the point 211*b* are associated with each other by a connection link 211*c*.

Similarly, a point 215*a* and a point 215*b* represent the same point on the scanned object but the point 215*a* is assigned to the slice 220 and the point 215*b* is assigned to the slice 230. The point 215*a* and the point 215*b* are associated with each other by a connection link 215*c*.

An avatar may be represented by long sequences of slices connected using the illustrated principals.

Collectively, the connection links make up a connection map that capture the relationships between the points at the edges between the slices so that the slices can be reassembled after processing. The slices are reassembled by bringing the slices together and removing each redundant point linked at the boundary.

In some embodiments, the point cloud shown represents a portion of the avatar. In some embodiments, the point cloud shown represents a portion of the avatar wearing at least one article of clothing of other wearable.

In a preferred embodiment, the avatar is aligned with and the point cloud for the reference mannequin are aligned and sliced as described herein so that each slice for the wearable has a corresponding slice for the reference mannequin. The corresponding slices are associated with the same portion of the reference mannequin. These corresponding slices can be processed together independently of the other slices thereby enabling parallel processing for better performance. In other embodiments, an unsliced avatar point cloud is modified using the difference table for a wearable.

Figure 5:
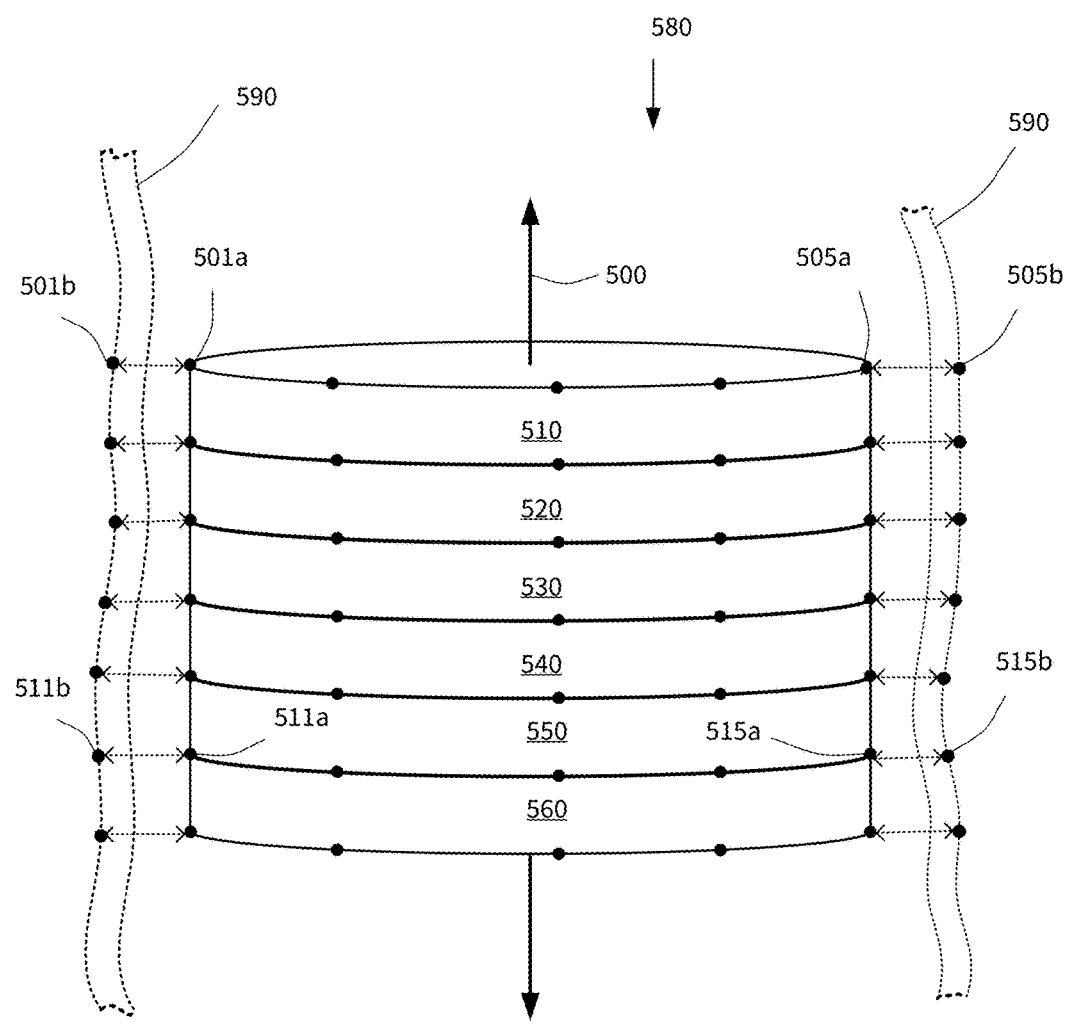
FIG. 5 illustrates one embodiment of a segment of a point cloud for an avatar and a cross section of a point cloud for a wearable.

FIG. 5 illustrates one embodiment of a segment of a point cloud 580 for the avatar that has been reassembled from a slice 510, a slice 520, a slice 530, a slice 540, a slice 550, and a slice 560, having a lengthwise axis 500 crossing through the centroid of each slice. A point cloud for avatar is typically made up of many more slices, and may have many different lengthwise axes for certain features depending on the relative orientation of the segments for portions of the arms, legs, and trunk, for example.

The segment of the point cloud 580 may represent a portion of a leg of the avatar and the segment of the point cloud 590 may represent the leg portion of a pair of pants.

Only a cross-section portion of the point cloud 590 is shown. It is common for the point cloud of the wearable to wrap around the point cloud 580. The point cloud 590 is also separated into slices. The portion of the point cloud 590 that wraps in front of and behind the segment of the point cloud 580 is not shown to clearly illustrate the computation of a difference table representing the 3D positions of the point cloud 590 as offset from the point cloud 580.

The point cloud 590 is generated from the associated point in the point cloud 580. These positions are associated because both points are associated with the same point in the point cloud for reference mannequin used to generate the difference table for the wearable.

In a preferred embodiment, each difference in the difference table is associated identified using lookup table indexing based on the associated one of the standard points of the reference mannequin. The difference is applied to the point on the avatar using the simple arithmetic operation. In some embodiments, these operations can be performed in parallel for each slice using one or more graphics processing units.

These point clouds are shown with the slices assembled because that is the positioning which is analogous to the real-world scenario of a wearable wrapped around a portion of a avatar. Thus, a human is better able to intuitively understand the relationships discussed during the calculations. However, the difference table calculations are generally performed on slices that have been separated as shown in FIG. 4 so that slices can be efficiently processed in parallel by one or more graphics processing units.

A point 501b in the point cloud 590 represents a point on the surface of the wearable at a slice (not shown) that is aligned with a point 501a in the point cloud 590 (avatar) that represents a point on the surface of the user's body at the slice 510. The position of the point 501b is computed by adding the difference for that point (looked up in the difference table) to the position of the point 501a. The difference represents the distance that the surface of the wearable is positioned from the surface of the underlying body.

Similarly, on the opposite side of the point cloud 580, a point 505b in the point cloud 590 represents a point on the surface of the wearable at a slice (not shown) that is aligned with a point 505a in the point cloud 590 (avatar) that represents a point on the surface of the user's body at the slice 510. The position of the point 505b is computed by adding the difference for that point (looked up in the difference table) to position of the point 505a. The difference represents the distance that the surface of the wearable is positioned from the surface of the underlying body.

A point 511b in the point cloud 590 represents a point on the surface of the wearable at a slice (not shown) that is aligned with a point 511a in the point cloud 590 (avatar) that represents a point on the surface of the user's body at the slice 550. The position of the point 511b is computed by adding the difference for that point (looked up in the difference table) to the position of the point 511a. The difference represents the distance that the surface of the wearable is positioned from the surface of the underlying body.

Similarly, on the opposite side of the point cloud 580, a point 515b in the point cloud 590 represents a point on the surface of the wearable that is aligned with a point 505a in the point cloud 580 (avatar) that represents a point on the surface of the user's body at the slice 550. The position of the point 515b is computed by adding the difference (looked up in the difference table) to position of the point 515a. The difference represents the distance that the surface of the wearable is positioned from the surface of the underlying body.

There are numerous other points in the point cloud 580, not only at the boundaries between the slices, but along the sides within each slice to define the contours of the surface along the side walls of each slice. Similarly, there are numerous other points in the point cloud 590, not only at the boundaries between the slices, but along the sides within each slice to define the contours of the surface along the side walls of each slice.

Figure 6:
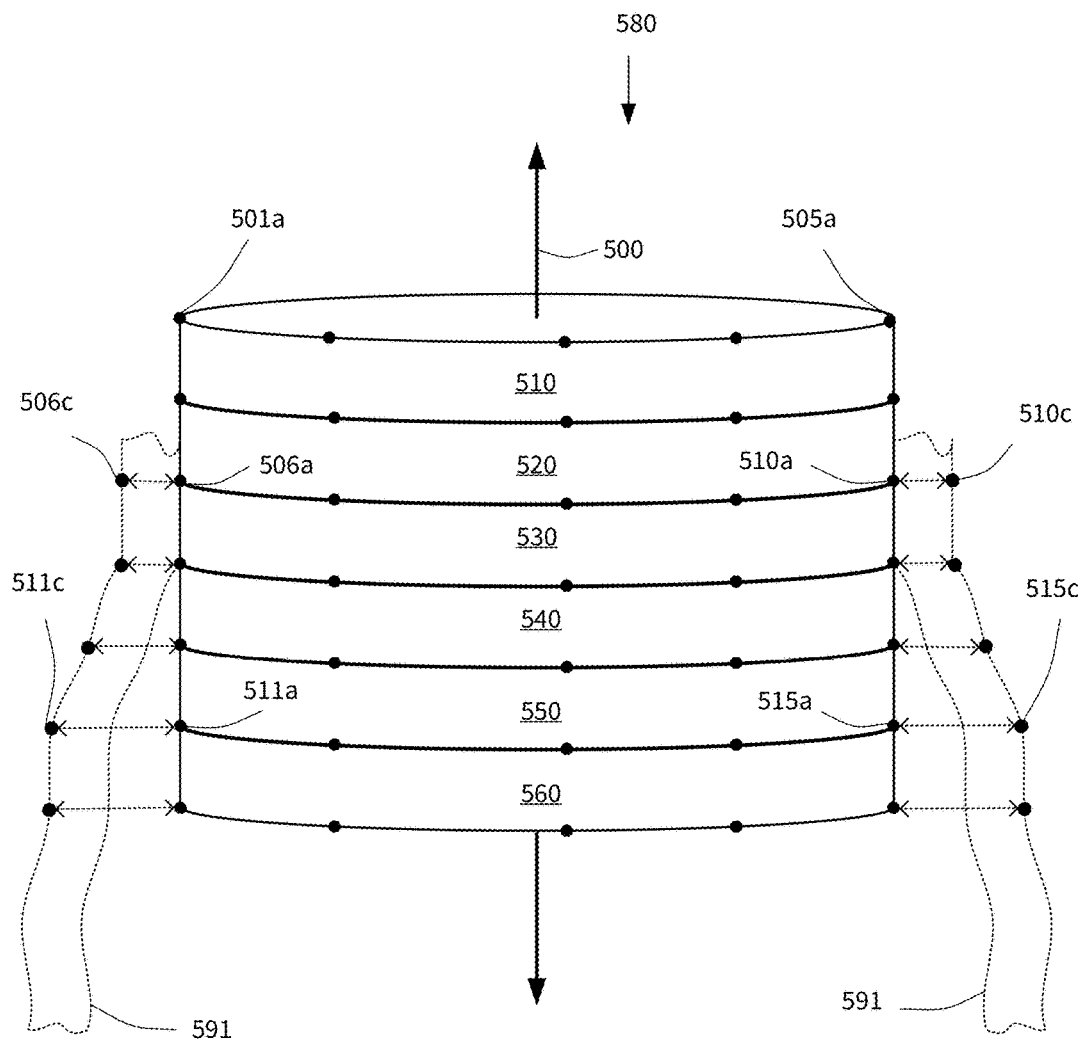
FIG. 6 illustrates another embodiment of a segment of a point cloud for an avatar and a cross section of a point cloud for a wearable.

FIG. 6 illustrates one embodiment of a segment of a point cloud 580 for the avatar that has been reassembled from a slice 510, a slice 520, a slice 530, a slice 540, a slice 550, and a slice 560, having a lengthwise axis 500 crossing through the centroid of each slice. A point cloud for an avatar is typically made up of many more slices, and may have many different lengthwise axes for certain features depending on the relative orientation of the segments for portions of the arms, legs, and trunk, for example.

The segment of the point cloud 580 may represent a portion of the avatar and the segment of the point cloud 590 may represent a portion of a wearable 591.

Only a cross-section portion of the point cloud 591 is shown. It is common for the point cloud of the wearable to wrap around the point cloud 580. The point cloud 591 is also separated into slices. The portion of the point cloud 591 that wraps in front of and behind the segment of the point cloud 580 is not shown to clearly illustrate the computation of a difference table representing the 3D positions of the point cloud 591 as offset from the point cloud 580.

The point cloud 591 is generated from the associated point in the point cloud 580. These positions are associated because both points are associated with the same point in the point cloud for reference mannequin used to generate the difference table for the wearable.

In a preferred embodiment, each difference in the difference table is associated identified using lookup table indexing based on the associated one of the standard points of the reference mannequin. The difference is applied to the point on the avatar using the simple arithmetic operation. In some embodiments, these operations can be performed in parallel for each slice using one or more graphics processing units.

These point clouds are shown with the slices assembled because that is the positioning which is analogous to the real-world scenario of a wearable wrapped around a portion of a reference mannequin. Thus, a human is better able to intuitively understand the relationships discussed during the calculations. However, the following calculations are generally performed on slices that have been separated as shown in FIG. 4 so that slices can be efficiently processed in parallel by graphics processing units.

The point cloud 591 is for a simplified wearable not to scale with reference to the slices. It is primarily configured here to illustrate various exemplary relationships between the point cloud for a wearable and the point cloud for the reference mannequin for the purposes of computation of a difference table. The point cloud for the wearable 591 is shown in dotted lines to highlight that it is a constellation of points that define the surface as positioned relative to the underlying body of the avatar.

The cross-section portion of the point cloud 591 does not extend over the portion of the slice 510. The point cloud 580 has a point 501a and a point 505a as derived from the scan process of the avatar. When the difference table is applied, the surface points at the slice 510 will be the same as that captured for the avatar since the avatar is naked at this slice. In a preferred embodiment, the system for generating difference tables determines whether a difference is stored for the entry associated with the point 501a. In this case, the difference between these corresponding points in the point cloud 591 and the point cloud 580 is zero. In a preferred embodiment, an entry in the difference table is not created for such points. The color and texture of the body of the avatar at point 501a is used because it is not covered by the wearable.

A point 506c in the point cloud 591 represents a point on the surface of the wearable that is aligned with a point 506a in the point cloud 580 (avatar) that represents a point on the surface of the user's body at the slice 520. The position of the point 511b is computed by adding the difference for that point (looked up in the difference table) to the position of the point 506a. The difference represents the distance that the surface of the wearable is positioned from the surface of the underlying body. In this case, the wearable is skin-tight in that the inner surface of the wearable lies up against the surface of the underlying body.

Similarly, on the opposite side of the point cloud 580, a point 510c in the point cloud 591 represents a point on the surface of the wearable that is aligned with a point 510a in the point cloud 580 (avatar) that represents a point on the surface of the user's body at the slice 520. The position of the point 510c is computed by adding the difference (looked up in the difference table) to position of the point 510a. The difference represents the distance that the surface of the wearable is positioned from the surface of the underlying body. In this case, the wearable is skin-tight in that the inner surface of the wearable lies up against the surface of the underlying body.

A point 511c in the point cloud 591 represents a point on the surface of the wearable that is aligned with a point 511a in the point cloud 580 (avatar) that represents a point on the surface of the user's body at the slice 550. The position of the point 511c is computed by adding the difference for that point (looked up in the difference table) to the position of the point 511a. The difference represents the distance that the surface of the wearable is positioned from the surface of the underlying body. In this case, there is a gap between the inner surface of the wearable and the surface of the underlying body.

Similarly, on the opposite side of the point cloud 580, a point 515c in the point cloud 591 represents a point on the surface of the wearable that is aligned with a point 515a in the point cloud 580 (avatar) that represents a point on the surface of the user's body at the slice 550. The position of the point 515c is computed by adding the difference for that point (looked up in the difference table) to the position of the point 515a. The difference represents the distance that the surface of the wearable is positioned from the surface of the underlying body. In this case, there is a gap between the inner surface of the wearable and the surface of the underlying body.

It should be noted that in a preferred embodiment, the difference table does not capture details about the inner surface of the wearable. In that sense both the wearable at the point 506c and the point 510c are computed the same way and represent the outer surface of the wearable, with no distinction made as to whether the wearable is skin-tight at that point.

There are numerous other points in the point cloud 580, not only at the boundaries between the slices, but along the sides within each slice to define the contours of the surface along the side walls of each slice. Similarly, there are numerous other points in the point cloud 590, not only at the boundaries between the slices, but along the sides within each slice to define the contours of the surface along the side walls of each slice. A scalar distance is computed between the corresponding points in the point cloud 590 and the point cloud 580 and stored in a table and each distance is associated with each slice and point of the reference mannequin. These distances are also referred to as a difference, and the table is sometimes referred to as a difference table.

Figure 7:
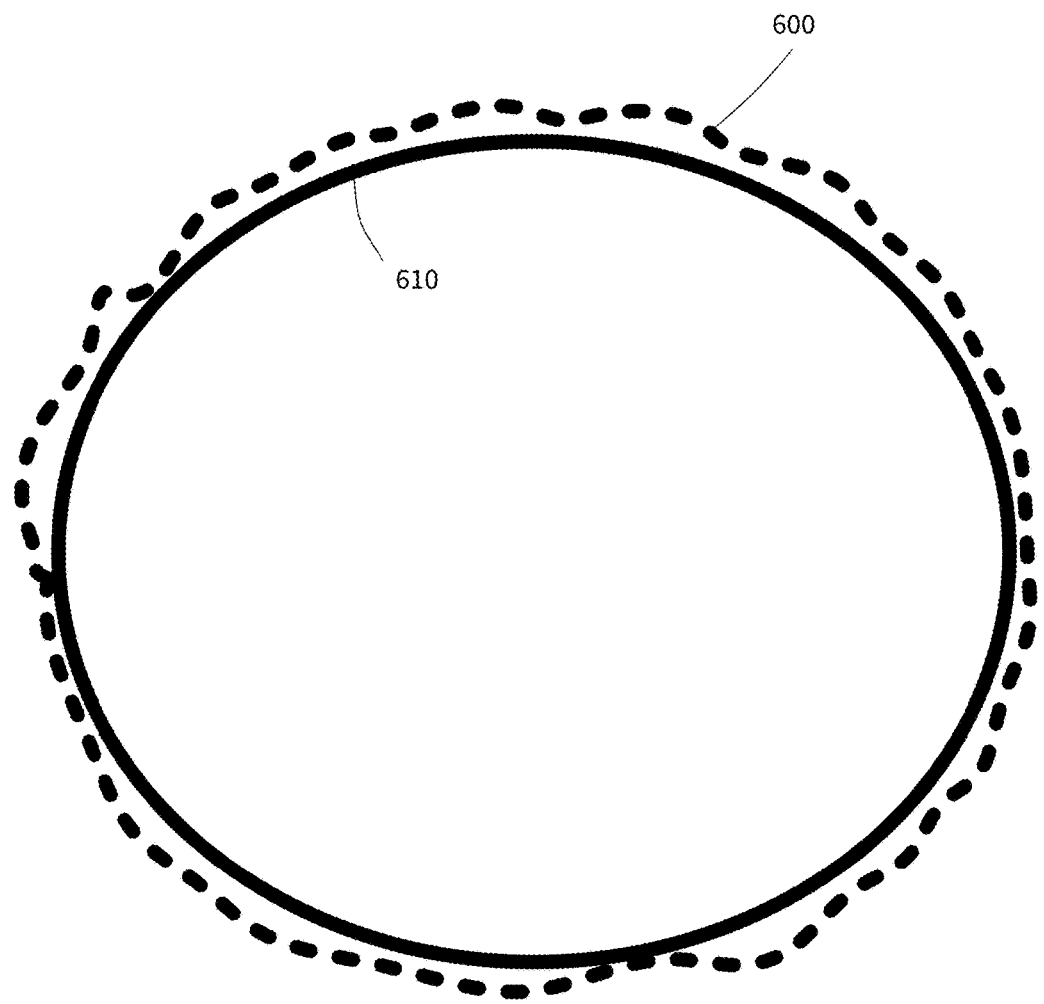
FIG. 7 represent one embodiment of a cross section of the generic ellipse and wearable during the coarse sizing process.

FIG. 7 shows the generic ellipse and a cross section of the point cloud of the wearable at a key slice of the avatar.

A perimeter is calculated for each key slice of the avatar. Key slices are associated with key measurements for a wearable. Key measurements might include bust size, hip size and shoulder width. The key slices for bust size would be the slices in the bust area of the trunk of the avatar. In a preferred embodiment the perimeter is calculated by integrating along the vertices of the perimeter of the slice. In one embodiment each slice has about 5000 vertices.

A generic ellipse 610 with low polygon counts (e.g., 256 vertices) is fitted to each slice for faster perimeter calculation. In one embodiment, the generic ellipse shape and its foci are picked from statistical information on human body shapes.

A coarse scaling factor is calculated by scaling the generic ellipse for each slice to the wearable selected to be virtually tried on. For example, the perimeter for a particular slice might be between the small and medium sizes of the wearable. The coarse scaling factor to scale the perimeter for a particular key slice to small size may be 1.5 and the coarse scaling factor to scale the perimeter to medium-size for particular slice may be 2.2.

The coarse scaling factor is applied to key slices of the avatar and the calculated perimeter.

Figure 8:
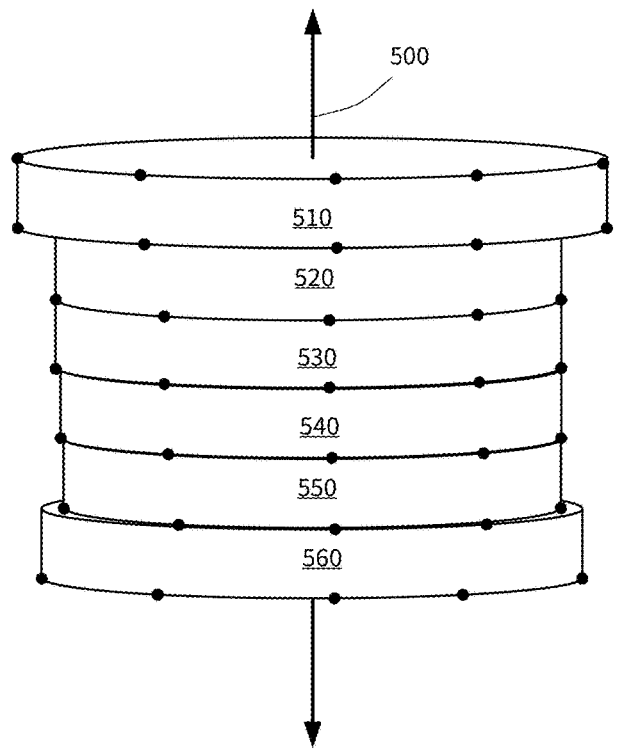
FIG. 8 illustrates one embodiment of a segment of a point cloud for an avatar having two key slices that have been resized.

FIG. 8 shows one embodiment of a segment of a point cloud 580 for the avatar that has been reassembled from a slice 510, a slice 520, a slice 530, a slice 540, a slice 550, and a slice 560, having a lengthwise axis 500 crossing through the centroid of each slice. A point cloud for avatar is typically made up of many more slices, and may have many different lengthwise axes for certain features depending on the relative orientation of the segments for portions of the arms, legs, and trunk, for example.

The slice 510 and the slice 560 represent key slices that have been resized using the coarse sizing factor and the iterative scaling process described herein. Other scaling processes may be used. The slice 520, the slice 530, the slice 540 and the slice 560 have not yet been resized and represent a discontinuity in the surface of the segment of the avatar.

Figure 9:
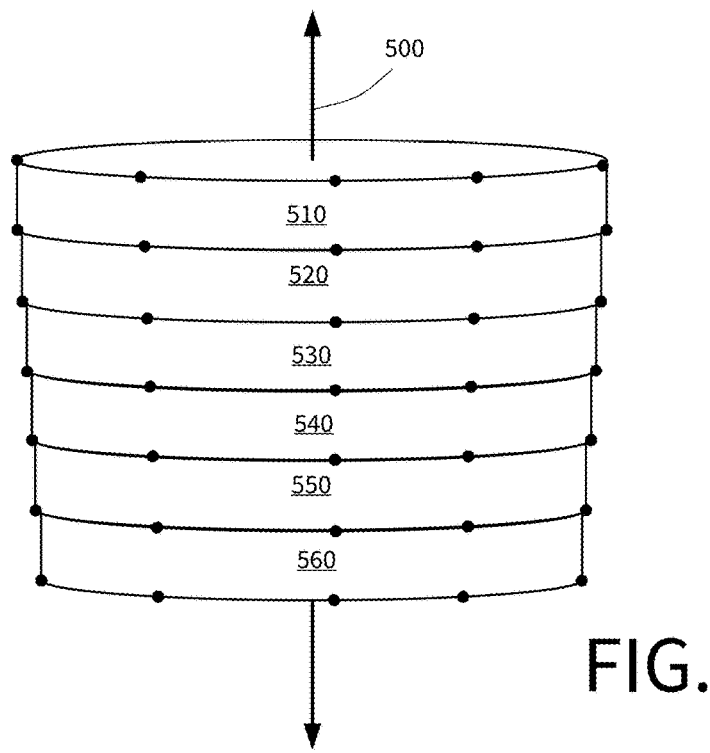
FIG. 9 illustrates one embodiment of a segment of a point cloud for an avatar having two key slices that have been resized, after resizing the intermediate slices using interpolation.

FIG. 9 shows one embodiment of a segment of a point cloud 580 for the avatar that has been reassembled from a slice 510, a slice 520, a slice 530, a slice 540, a slice 550, and a slice 560, having a lengthwise axis 500 crossing through the centroid of each slice.

The slice 510 and the slice 560 represent key slices that have been resized using the coarse sizing factor and the iterative scaling process described herein. In contrast with FIG. 9, the slice 520, the slice 530, the slice 540 and the slice 560 have been resized using an interpolation of scaling factors between the slice 510 and the scaling factor for the slice 560. Now the size of the slices gradually transition between the size at the slice 510 and the size at the slice 560.

Figure 10:
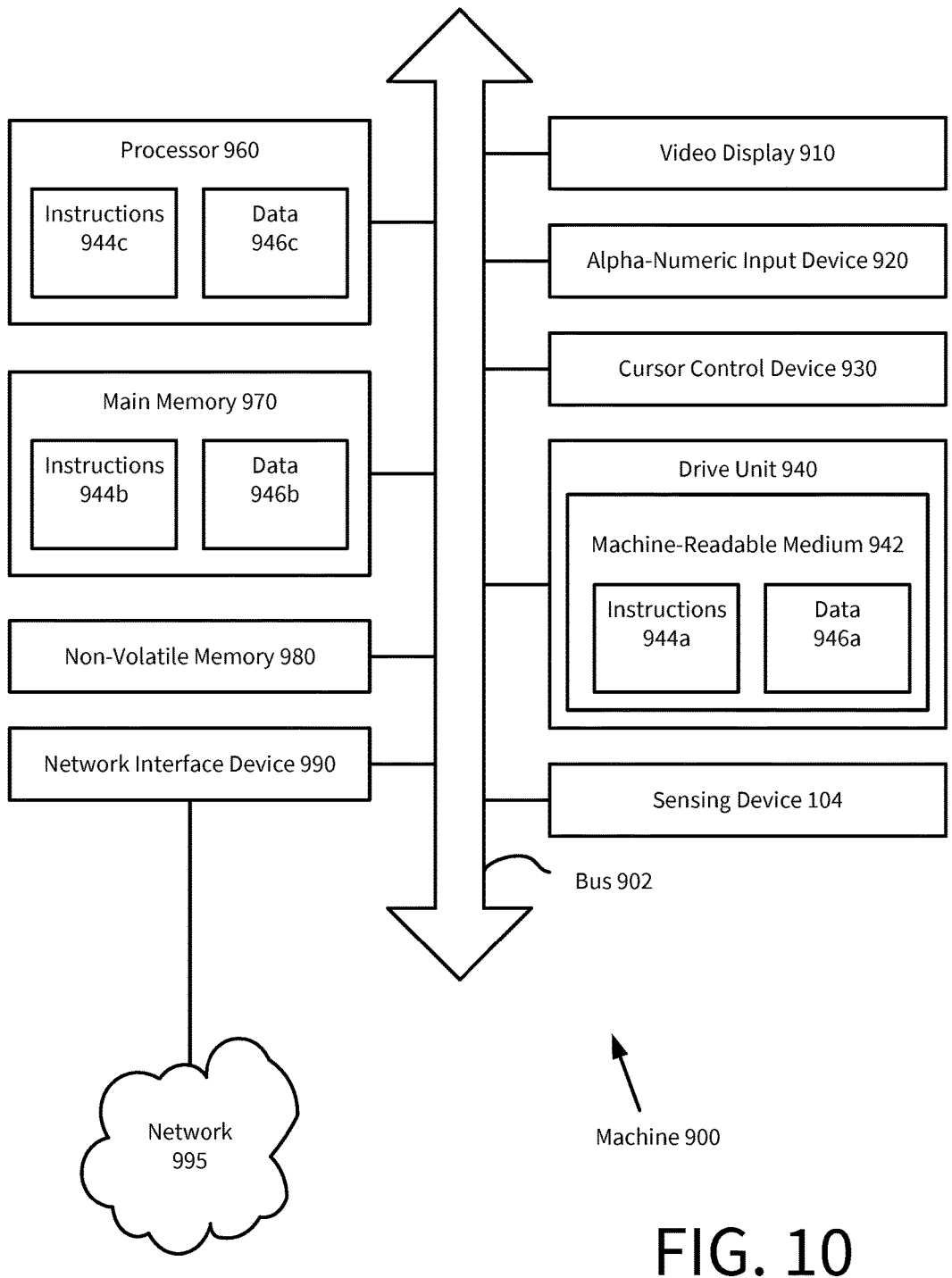
FIG. 10 is a diagrammatic representation of an embodiment of a machine, within which a set of instructions for causing the machine to perform one or more of the methods discussed herein.

FIG. 10 is a diagrammatic representation of an embodiment of a machine 900, within which a set of instructions for causing the machine to perform one or more of the methods discussed herein. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with a server to facilitate operations of the server and/or to access the operation of the server. In some embodiments, the machine may act as a server for some functions and a client for other functions.

In some embodiments, the machine 900 is the system 150 according to an embodiment as described herein or a component of such systems, such as one or more processors that make up the system 150. In other embodiments, the machine 900 is the database system 110 according to an embodiment as described herein.

The machine 900 includes a processor 960 (e.g., a central processing unit (CPU), a graphics processing unit (GPU) or both), a main memory 970 and a nonvolatile memory 980, which communicate with each other via a bus 902. In some embodiments, the machine 900 may be a cluster of computers or comprise multiple processors or multiple processor cores. In one embodiment, the machine 900 also includes a video display 910, an alphanumeric input device 920 (e.g., a keyboard), a cursor control device 930 (e.g., a mouse), a drive unit 940 (e.g., solid state drive (SSD), hard disk drive, Digital Versatile Disk (DVD) drive, or flash drive), a sensing device 950 (e.g., a speaker) and a network interface device 990.

In some embodiments, the machine 900 is includes the sensing device 104.

In some embodiments, the video display 910 includes a touch-sensitive screen for user input. In some embodiments, the touch-sensitive screen is used instead of a keyboard and mouse. The drive unit 940 includes a machine readable medium 942 on which is stored one or more sets of instructions 944a (e.g. software) embodying any one or more of the methods or functions of the inventive subject matter.

Some or all of the instructions 944a may also reside, as instructions 944b on machine-readable media within the main memory 970 and as instructions 944c within machine-readable media within the processor 960 during execution thereof by the machine 900. The instructions 944a may also be transmitted or received over a network 995 via the network interface device 990. In some embodiments, the machine-readable medium 942 also includes data 946a including scan information and point clouds as described herein. Some or all of the data 946a may also reside, as data 946b on machine-readable media within the main memory 970 and as data 946c within machine-readable media within the processor 960 during execution of the instructions 944a by the machine 900.

While the machine-readable medium 942 is shown in an exemplary embodiment to be a single medium, the term "machine-readable medium" should be taken to include a single medium or multiple media (e.g., a centralized or distributed database, and/or associated caches and servers) that store the one or more sets of instructions and/or data. The term "machine readable medium" shall also be taken to include any non-transitory medium that is capable of storing, encoding or carrying a set of instructions for execution by the machine and that cause the machine to perform any one or more of the methods or functions of the inventive subject matter. The term "machine-readable medium" shall accordingly be taken to include, but not be limited to, solid-state memories, optical and magnetic media, and other non-transitory tangible media.

In general, the methods executed to implement the embodiments of the disclosure, may be implemented as part of an operating system or a specific application, component, program, object, module or sequence of instructions referred to as "programs." For example, one or more programs may be used to execute specific processes according to the inventive subject matter. The programs typically comprise one or more instructions set at various times in various memory and storage devices in the machine, and that, when read and executed by one or more processors, cause the machine to perform operations to execute methods, functions and other elements of the inventive subject matter.

Moreover, while embodiments have been described in the context of machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include, but are not limited to, recordable type media such as volatile and non-volatile memory devices, solid state drives (SSDs), flash memory devices, floppy and other removable disks, hard disk drives, and optical disks such as Compact Disk Read-Only Memory (CD-ROMS) and Digital Versatile Disks (DVDs), among others.

Figure 11:
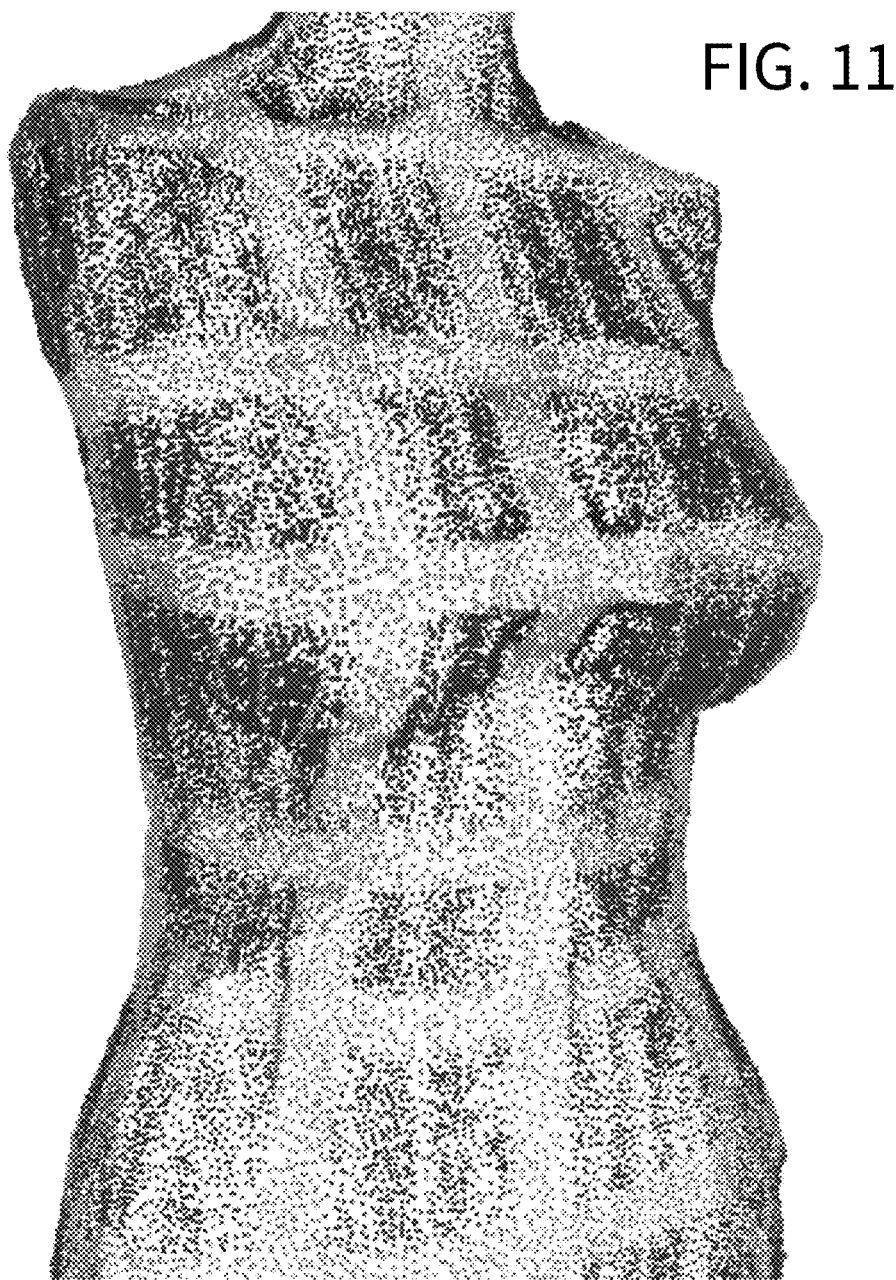
FIG. 11 shows one embodiment of a torso portion of the point cloud for a reference mannequin.

FIG. 11 illustrates one embodiment of the torso portion of a point cloud for a reference mannequin. The point cloud defines the surface shape of the portion of the reference mannequin.

The torso portion of the point cloud for an avatar might look very similar except that the color and texture of the surface of the avatar would be different than that of the mannequin.

Figure 12:
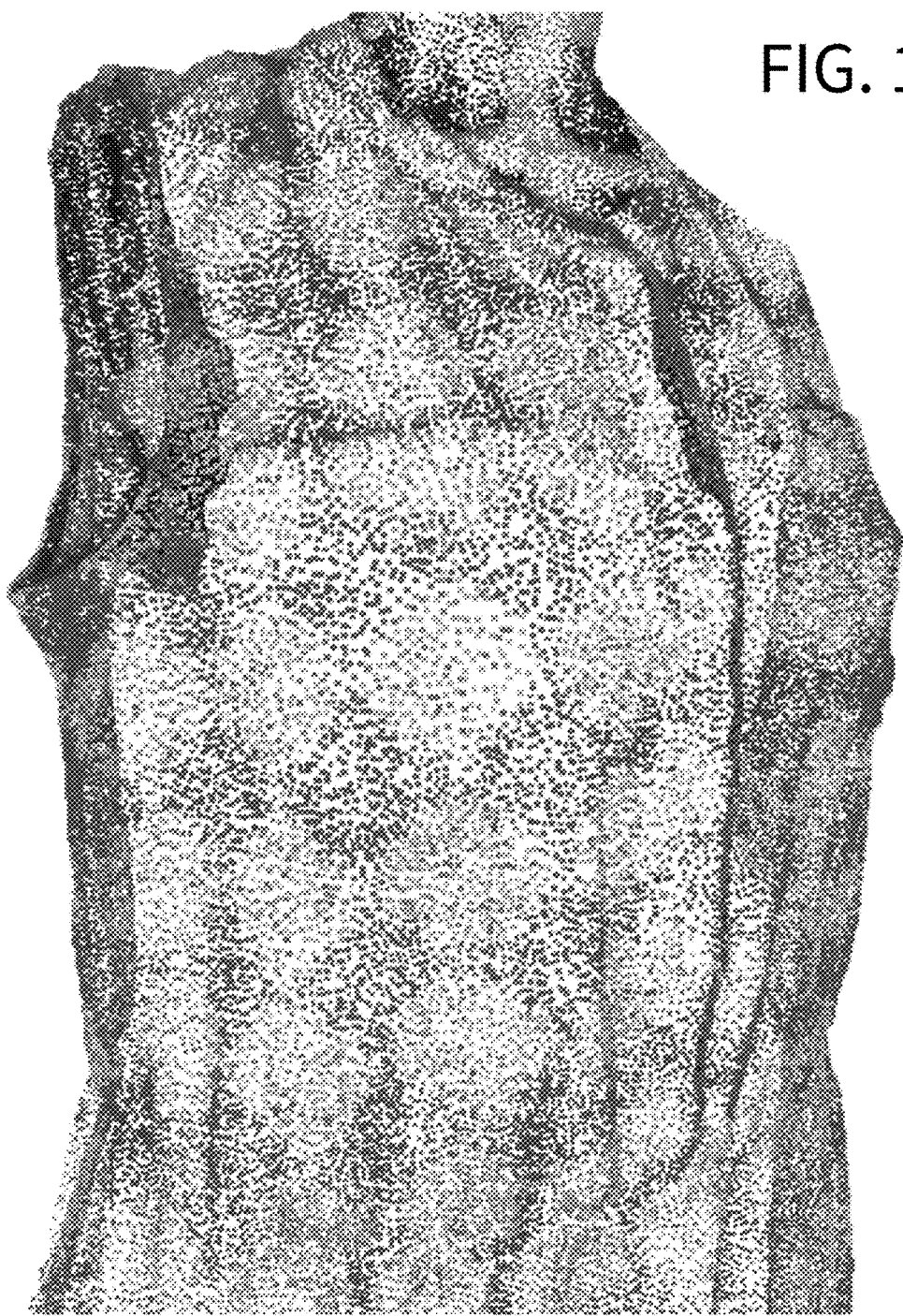
FIG. 12 shows one embodiment of a torso portion of the point cloud for a reference mannequin wearing a blouse.

FIG. 12 illustrates one embodiment of the torso portion of a point cloud for a reference mannequin wearing a blouse. The point cloud defines the surface shape of the portion of the blouse where it covers the torso, and the surface shape of the torso where the blouse does not cover the torso—in this case the neck.

The torso portion of the point cloud for an avatar dressed with a blouse might look very similar except that the color and texture of the surface of the avatar would be different than that of the mannequin.

What is claimed is:

1. A system for creating a model of a wearable on a portion of a human body, the system comprising:
   a processor configured to generate or create a three-dimensional model of a portion of a human body wearing the wearable, the processor configured to:
   (a) access a three-dimensional model of a portion of a human body comprising a plurality of vertices;
   (b) access a table, the table comprising a model of the wearable comprising a plurality of values, each of the values being associated with one of the plurality of vertices;
   (c) add each of the plurality of values to the distance of each corresponding one of the plurality of vertices, the associated value representing a distance between the surface of the wearable and the underlying surface of the human body; and
   a system memory for storing the table.

2. A system for creating a model of a wearable on a portion of a human body, the system comprising:
   a processor configured to generate or create a three-dimensional model of a portion of a human body wearing the wearable, the processor configured to:
   (a) access a three-dimensional model of a portion of a human body comprising a plurality of slices each having a plurality of vertices around a centroid;
   (b) access a table, the table comprising a model of the wearable comprising a plurality of values, each of the values being associated with one of the plurality of vertices around the centroid of one of the plurality of slices;
   (c) add each of the plurality of values to the distance of each corresponding one of the plurality of vertices around the centroids of the plurality of slices, the associated value representing a distance between the surface of the wearable and the underlying surface of the human body; and
   a system memory for storing the table.

3. The system of claim 2, wherein the processor is further configured to align the three-dimensional model of the portion of the human body with the model of the wearable.

4. The system of claim 2, further comprising the step of generating a plurality of slices along at least one longitudinal axis through the first and second point clouds wherein a selected one of the plurality of slices is scaled to fit a key measurement of the wearable using a first scaling factor associated with the key measurement for the wearable.

5. The system of claim 3, wherein the key measurement is one of bust size, hip size, and shoulder length.

6. The system of claim 4, wherein the perimeter of the selected one of the plurality of slices is estimated by fitting an ellipse to the selected slice.

7. The system of claim 6, wherein the shape and the loci of the ellipse for the selected slice is based on a statistical model of the human body at the portion of the human body associated with the selected slice.

8. The system of claim 6 wherein each of a first plurality of scaling factors is associated with one of a plurality of sizes for the wearable, the perimeter of the selected slice being scaled by one of the plurality of first scaling factors associated with a selected size of the plurality of sizes of the wearable.

9. The system of claim 8, wherein the processor is further configured to:
   adjust the first scaling factor scale and the selected one of the first scaling factors scaled by a second factor for each selected one of the plurality of slices.

10. The system of claim 9, wherein the second factor for each of the plurality of slices is determined by interpolating between the scale factor determined by sizing the selected plurality of slices, and scaling each of the plurality of slices according to the associated scale factor.

11. A system for creating a model of a plurality of wearables on a portion of a human body, the system comprising:
    a processor configured to generate or create a three-dimensional model of a portion of a human body wearing the plurality of wearables, the processor configured to:
    (a) access a three-dimensional model of a portion of a human body comprising a plurality of slices each having a plurality of vertices around a centroid;
    (b) access a table, the table comprising a plurality of models each corresponding to one of the plurality of wearables, each of the plurality of models comprising a plurality of values, each of the values for each of the plurality of models being associated with one of the plurality of vertices around the centroid of one of the plurality of slices;
    (c) add each of the plurality of values to the distance of each corresponding one of the plurality of vertices around the centroids of the plurality of slices, the associated value representing a distance between the surface of the wearable and the underlying surface of the human body; and
    a system memory for storing the table.

12. The system of claim 11, wherein the perimeter of the selected one of the plurality of slices is calculated by integrating along the vertices of the perimeter of the selected slice.

13. The system of claim 11, wherein the perimeter of the selected one of the plurality of slices is calculated by integrating along the vertices of the perimeter of the selected slice.

14. The system of claim 13, wherein the first scaling factor is scaled by a second scaling factor determined by the relationship between the key slice scaled by the first scaling factor to the perimeter of the mesh garment.

15. The system of claim 14, wherein the second scaling factor is iteratively determined by scaling up or down until the relationship between the is within a comfort factor.

16. The system of claim 14, wherein the comfort factor is determined for particular users based on feedback as to actual fit from wearables selected based on virtual fittings of those wearables on the user.

17. The system of claim 14, wherein the scaling factors for slices other that key slices are determined at least in part by interpolation between the key slices.

* * * * *